United States Patent
Ko et al.

(10) Patent No.: US 8,417,256 B2
(45) Date of Patent: Apr. 9, 2013

(54) APPARATUS AND METHOD FOR REDUCING INTER-CELL INTERFERENCE IN WIRELESS COMMUNICATION SYSTEM

(75) Inventors: Eun-Seok Ko, Donghae-si (KR); Tak-Ki Yu, Yongin-si (KR); Eun-Yong Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 12/783,853

(22) Filed: May 20, 2010

(65) Prior Publication Data

US 2010/0298006 A1 Nov. 25, 2010

(30) Foreign Application Priority Data

May 21, 2009 (KR) .................. 10-2009-0044523

(51) Int. Cl.
*H04W 72/00* (2009.01)

(52) U.S. Cl.
USPC ......... 455/452.2; 455/450; 455/63.1; 455/25; 455/101; 455/562.1

(58) Field of Classification Search ....... 455/450–452.2, 455/25, 101, 561–562.1
See application file for complete search history.

(56) References Cited

U.S. PATENT DOCUMENTS

| | | | |
|---|---|---|---|
| 7,248,841 B2 * | 7/2007 | Agee et al. | 455/101 |
| 7,583,745 B2 * | 9/2009 | Pasanen et al. | 375/267 |
| 7,627,348 B2 * | 12/2009 | Lysejko et al. | 455/562.1 |
| 8,059,744 B2 * | 11/2011 | Jin et al. | 375/267 |
| 8,086,181 B2 * | 12/2011 | Wee et al. | 455/63.1 |
| 8,090,041 B2 * | 1/2012 | Zheng | 375/267 |
| 8,140,024 B2 * | 3/2012 | Prasad et al. | 455/69 |
| 8,320,834 B2 * | 11/2012 | Lu et al. | 455/63.1 |
| 2002/0042290 A1 * | 4/2002 | Williams et al. | 455/562 |
| 2010/0234040 A1 * | 9/2010 | Palanki et al. | 455/452.2 |
| 2011/0003606 A1 * | 1/2011 | Forenza et al. | 455/501 |
| 2011/0319092 A1 * | 12/2011 | Kim et al. | 455/452.1 |

* cited by examiner

*Primary Examiner* — Sharad Rampuria
(74) *Attorney, Agent, or Firm* — Jefferson IP Law, LLP

(57) ABSTRACT

An apparatus and a method for beamforming in a wireless communication using a Base Station (BS) cooperative scheme are provided. The beamforming method includes exchanging channel status information with at least one cooperative BS which provides a BS cooperative service, generating a beamforming weight based on the channel status information, determining channel variation caused by a time delay in the channel status information exchange with the cooperative BS, updating the generated beamforming weight based on the channel variation, and precoding a transmit signal based on the updated beamforming weight.

18 Claims, 10 Drawing Sheets

APPARATUS AND METHOD FOR REDUCING INTER-CELL INTERFERENCE IN WIRELESS COMMUNICATION SYSTEM

PRIORITY

The present application claims the benefit under 35 U.S.C. §119(a) of a Korean patent application filed in the Korean Intellectual Property Office on May 21, 2009, and assigned Serial No. 10-2009-0044523, the entire disclosure of which is hereby incorporated by reference.

BACKGROUND OF THE INVENTION

1. Field of the Invention

The present invention relates to an apparatus and a method for reducing inter-cell interference in a wireless communication system. More particularly, the present invention relates to an apparatus and a method for addressing backhaul delay caused when a beamforming weight is generated in a multi-antenna system using a base station cooperative scheme.

2. Description of the Related Art

A multi-antenna system can adopt a base station cooperative scheme to reduce inter-cell interference. The multi-antenna system can mitigate the inter-cell interference using the base station cooperative scheme which is a multi-antenna scheme that extends various multi-antenna schemes used in a single cell to several base stations.

Using the base station cooperative scheme, the cooperating base stations should share channel information of terminals serviced with other base stations. For example, the base stations exchange the channel information with other base stations using a newly defined interface, such as an X2 interface.

When the cooperative base stations exchange the channel information as discussed above, processing delay and backhaul delay occur. For example, when the X2 interface is used as the backhaul between the base stations, the backhaul delay of 20 ms at maximum and 10 ms on average can occur as the base stations exchange the channel information.

As the base stations exchange the channel information, a channel between the base station and the terminal changes. Thus, the channel used for the base stations to determine the beamforming weight does not match the actual channel and the inter-cell interference rejection performance degrades.

SUMMARY OF THE INVENTION

An aspect of the present invention is to address at least the above-mentioned problems and/or disadvantages and to provide at least the advantages described below. Accordingly, an aspect of the present invention to provide an apparatus and a method for reducing inter-cell interference in a wireless communication system using a base station cooperative scheme.

Another aspect of the present invention is to provide an apparatus and a method for generating a beamforming weight by taking into account channel variation in channel information exchanged at a base station of a multi-antenna system using a base station cooperative scheme.

Yet another aspect of the present invention is to provide an apparatus and a method for updating a beamforming weight provided from a control server by taking into account channel variation caused by channel information exchanged at a base station of a multi-antenna system using a base station cooperative scheme.

Still another aspect of the present invention is to provide an apparatus and a method for feeding back channel status information of a terminal used to generate and to update a beamforming weight by taking into account channel variation caused by channel information exchanged at a base station of a multi-antenna system using a base station cooperative scheme.

In accordance with an aspect of the present invention, a method for beamforming at a Base Station (BS) in a wireless communication system using a BS cooperative scheme is provided. The method includes exchanging channel status information with at least one cooperative BS which provides a BS cooperative service, generating a beamforming weight based on the channel status information, determining channel variation caused by a time delay in the channel status information exchange with the cooperative BS, updating the generated beamforming weight based on the channel variation, and precoding a transmit signal based on the updated beamforming weight.

In accordance with another aspect of the present invention, a method for beamforming at a BS in a wireless communication system using a BS cooperative scheme is provided. The method includes transmitting channel status information of at least one serviced Mobile Station (MS), to a control server which generates beamforming weights for at least two BSs providing a BS cooperative service; when receiving the beamforming weights from the control server, determining channel variation caused by a time delay in the channel status information transmission to the control server; updating the beamforming weights provided from the control server based on the channel variation; and precoding a transmit signal using the updated beamforming weights.

In accordance with yet another aspect of the present invention, an apparatus for beamforming at a BS in a wireless communication system using a BS cooperative scheme is provided. The apparatus includes at least two antennas, a weight generator for generating a beamforming weight based on channel status information exchanged with at least one other BS providing a BS cooperative service, a weight updater for updating the beamforming weight generated by the weight generator based on channel variation caused by a time delay in the channel status information exchange with the other BS, and a precoder for precoding a transmit signal based on the beamforming weight fed from the weight updater.

In accordance with still another aspect of the present invention, an apparatus for beamforming at a BS in a wireless communication system using a BS cooperative scheme is provided. The apparatus includes at least two antennas, a wired interface for transmitting channel status information to a control server which generates beamforming weights for at least two BSs providing a BS cooperative service; a weight controller for, when receiving the beamforming weight from the control server, updating the beamforming weight received from the control server based on channel variation caused by a time delay in the channel status information transmission to the control server; and a precoder for precoding a transmit signal based on the beamforming weight provided from the weight controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for generating a beamforming weight by taking into account channel variation in a wireless communication system using a Base Station (BS) cooperative scheme.

Figure 1:
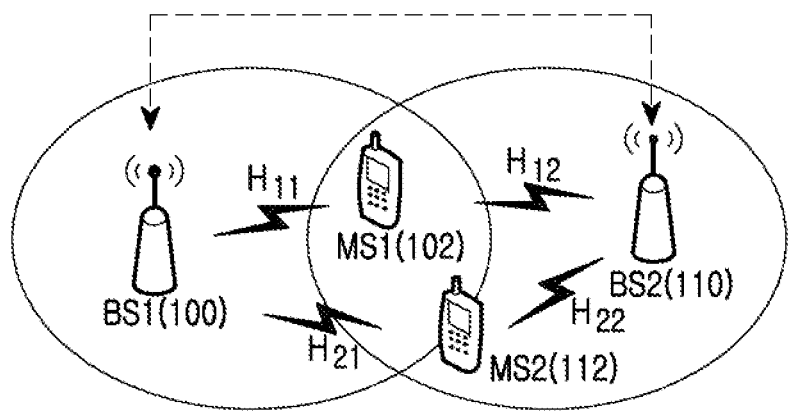
FIG. 1 illustrates a structure of a wireless communication system providing a base station cooperative service according to an exemplary embodiment of the present invention.

Hereinafter, it is assumed that a plurality of BSs including NT-ary antennas transmit a downlink signal to Mobile Stations (MSs) including NR-ary antennas through cooperation. For example, when two BSs including NT-ary antennas cooperate with each other, a wireless communication system is constituted as shown in FIG. 1. Notably, this also applies to transmission of an uplink signal.

FIG. 1 illustrates the structure of the wireless communication system providing the BS cooperative service according to an exemplary embodiment of the present invention.

Referring to FIG. 1, an MS1 102, which travels in a service coverage area of a BS1 100, is serviced by the BS1 100, or serviced by the BS1 100 and a BS2 110 at the same time. The BS1 100 is a serving BS of the MS1 102. An MS2 112, which travels in a service coverage area of the BS2 110, is serviced by the BS2 110, or serviced by the BS1 100 and the BS2 110 at the same time. The BS2 110 is a serving BS of the MS2 112. The MS1 102 and the MS2 112 are assumed to be able to acquire not only a channel to the serving BS but also a channel to a neighboring BS.

When using the BS cooperative scheme, the BS1 100 and the BS2 110 share channel status information acquired from the MSs 102 and 112 traveling in their service coverage area. For example, the BSs 100 and 110 exchange the channel status information acquired from sounding signals received from the MSs 102 and 112. The BS1 100 transmits $H_{11}$ information acquired from the sounding signal of the MS1 102 and $H_{21}$ information acquired from the sounding signal of the MS2 112 to the BS2 110 through the backhaul. The BS2 110 transmits $H_{12}$ information acquired from the sounding signal of the MS1 102 and $H_{22}$ information acquired from the sounding signal of the MS2 112 to the BS1 100 through the backhaul.

The BSs 100 and 110 may also exchange the channel status information provided from the MSs 102 and 112. The BS1 100 transmits the $H_{11}$ information and the $H_{12}$ information provided from the MS1 102 to the BS2 110 through the backhaul. The BS2 110 transmits the $H_{21}$ information and the $H_{22}$ information provided from the MS2 112 to the BS1 100 through the backhaul. $H_{11}$ indicates a downlink channel between the BS1 100 and the MS1 102, $H_{21}$ indicates a downlink channel between the BS1 100 and the MS2 112, $H_{12}$ indicates a downlink channel between the BS2 110 and the MS1 102, and $H_{22}$ indicates a downlink channel between the BS2 110 and the MS2 112.

When the BSs 100 and 110 share the channel status information, the BS1 100 and the BS2 110 generate a beamforming weight by taking into account the shared channel status information and channel variation generated when they exchange the channel status information. The BS1 100 and the BS2 110 may generate the beamforming weight in the same manner. The MS1 102 and the MS2 112 feed back the channel status information according to a direction of their serving BS in the same manner. Accordingly, descriptions provided below with respect to the BS1 100 and the MS1 102 are also applicable to the BS2 110 and the MS2 112.

Figure 2:
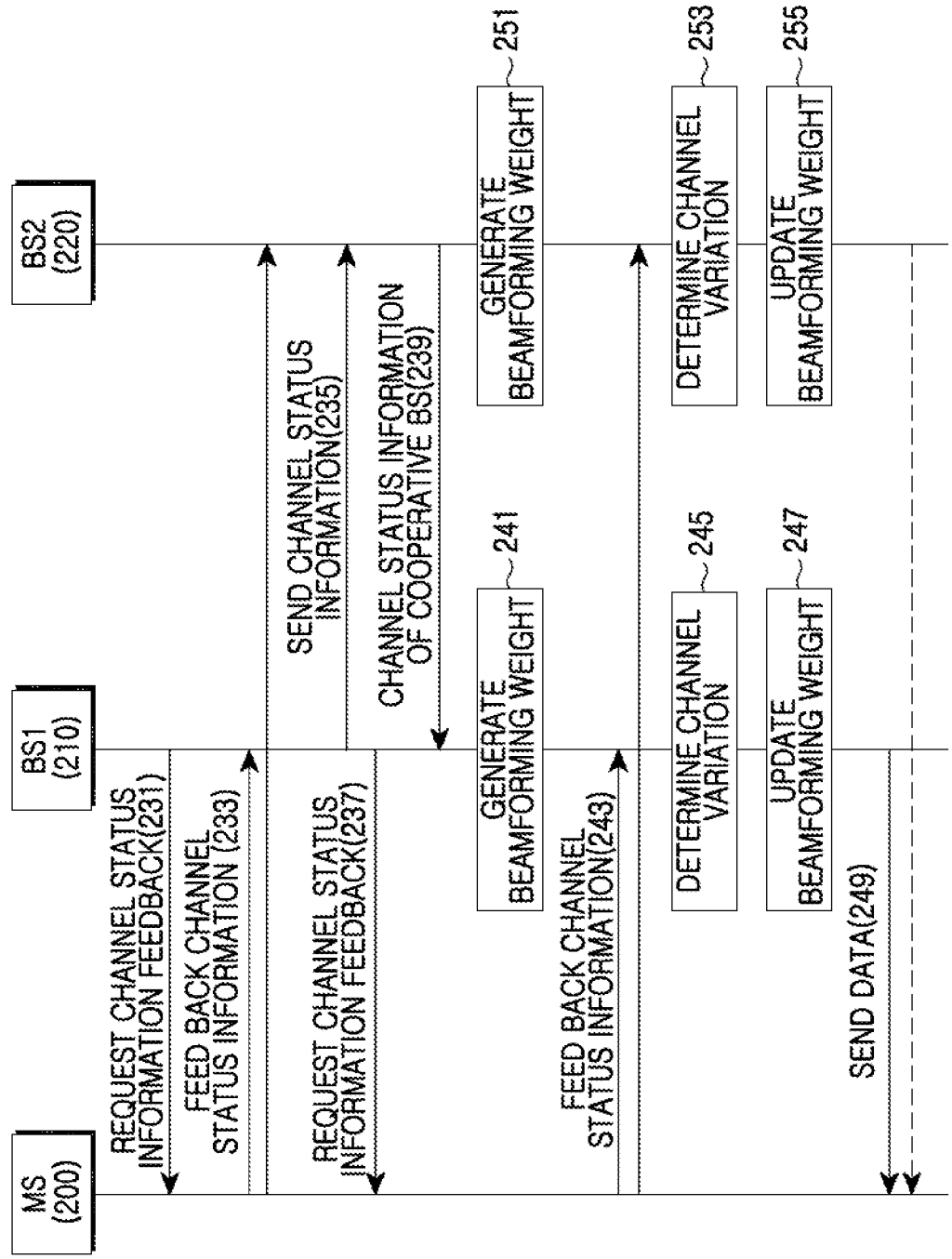
FIG. 2 illustrates a process for providing the base station cooperative service according to an exemplary embodiment of the present invention.

In FIG. 2, it is assumed that the MS sends a sounding channel to the BS and the BS generates the beamforming weight by taking into account the channel status information acquired from the sounding channel. When the MS transmits the channel status information to the BS, the BS may generate the beamforming weight in the same manner.

FIG. 2 illustrates a process for providing the BS cooperative service according to an exemplary embodiment of the present invention.

Referring to FIG. 2, the BS1 210 and the BS2 220 service the MS using the BS cooperative scheme. The BS1 210 requests a channel status information feedback to the serviced MS 200 in step 231. In so doing, the BS1 210 may also send time information for the MS 200 to feed back the channel status information.

According to the channel status information feedback request of the BS1 210, the MS 200 sends the sounding channel to the BS1 210 and the BS2 220 in step 233. For example, the MS 200 sends the same sounding signal to the BS1 210 and the BS2 220. Alternatively, the MS 200 may send different sounding signals to the BS1 210 and the BS2 220. Herein, the MS 200 sends the sounding signal according to the feedback time information provided from the BS1 210. The MS 210 may also send the sounding signal after the channel status information feedback is requested from the BS1 210 and a preset time elapses.

The BS1 210 and the BS2 220 acquire the channel status information of the MS 200 from the sounding signal received from the MS 200. For example, referring back to FIG. 1, the BS1 100 acquires the $H_{11}$ information from the sounding signal of the MS1 102 and the $H_{21}$ information from the sounding signal of the MS2 112. The BS2 110 acquires the $H_{12}$ information from the sounding signal of the MS1 102 and the $H_{22}$ information from the sounding signal of the MS2 112.

The BS1 210 transmits its acquired channel status information to the BS2 220 through the backhaul in step 235. To detect the channel variation during the channel status information exchange with the BS2 220, the BS1 210 requests the channel status information feedback to the MS 200 in step 237. The BS1 210 may also transmit feedback time information of the channel status information for the MS 200.

The BS2 220 transmits its acquired channel status information to the BS1 210 in step 239. The BS1 210 and the BS2 220 can exchange the channel status information at the same time or at the different times.

When receiving the channel status information from the BS2 220, the BS1 210 generates the beamforming weight using the channel status information of the MS 200 and the channel status information received from the BS2 220 in step 241. For example, when receiving the channel status information from the BS2 220, the BS1 210 acquires the channel status information as expressed in a channel matrix of Equation 1. The BS2 220 can acquire the same channel matrix as the BS1 210.

$$BS_1 = \begin{bmatrix} H_{11} & H_{12} \\ H_{21} & H_{22} \end{bmatrix} \qquad \text{[Equation 1]}$$

$H_{LK}$ denotes a channel between the BS K and the MS L.

Using the channel matrix of Equation 1, the BS1 210 can determine a beamforming weight vector in a Zero Forcing (ZF) manner based on Equation 2. Equation 2 expresses the beamforming weight vector without a power control process.

$$W = \begin{bmatrix} W_{11} & W_{21} \\ W_{12} & W_{22} \end{bmatrix} = \begin{bmatrix} H_{11} & H_{12} \\ H_{21} & H_{22} \end{bmatrix}^{\#} \qquad \text{[Equation 2]}$$

$W_{LK}$, which is an $N_T \times 1$ vector, denotes the beamforming weight vector generated by the BS K for the MS L. $H_{LK}$ denotes the channel between the BS K and the MS L, and $[\cdot]^{\#}$ denotes a pseudo inverse.

According to the channel status information feedback request of the BS1 210, the MS 200 sends the sounding channel to the BS1 210 and the BS2 220 in step 243. For example, the MS 200 sends the sounding signals according to the feedback time information provided from the BS1 210. Alternatively, the MS 200 may send the sounding signals after the channel status information feedback is requested from the BS1 210 and a preset time elapses.

When receiving the sounding channel from the MS 200, the BS1 210 confirms the channel status information of the MS 200 through the sounding channel. In step 245, the BS1 210 determines the channel variation by comparing the channel status information used to generate the beamforming weight and the confirmed channel status information. For example, to confirm the channel status information through the sounding channel provided from the MS 200, the BS1 210 acquires the channel status information of Equation 3.

$$BS_1 = \begin{bmatrix} H_{11} & H_{12} \\ H_{21} & H_{22} \end{bmatrix}, \begin{bmatrix} \tilde{H}_{11} \\ \tilde{H}_{21} \end{bmatrix} \qquad \text{[Equation 3]}$$

$H_{LK}$ denotes the channel between the BS K and the MS L used to generate the beamforming weight, and $\tilde{H}_{LK}$ denotes a channel between the BS K which generates and confirms the beamforming weight and the MS L.

The BS1 210 uses the channel status information of the cooperative BS to generate the beamforming weight. However, the BS1 210 does not need the channel status information of the cooperative BS to update the beamforming weight according to the channel variation. Since the BS2 220 cannot control the channels $H_{11}$ and $H_{21}$ between the BS1 210 and the MSs, the BS1 210 determines the channel variation based on Equation 4 using only the channel status information measured by itself. The BS1 210 can determine the channel variation only by meeting the condition $N_R \times MN \leq N_T$. $N_R$ denotes the number of the antennas of the MS, M denotes the number of the MSs, and $N_T$ denotes the number of the antennas of the BS.

$$t_K = f\left( \begin{bmatrix} \tilde{H}_{1K} \\ \vdots \\ \tilde{H}_{MK} \end{bmatrix}, \begin{bmatrix} H_{1K} \\ \vdots \\ H_{MK} \end{bmatrix}, \varepsilon_K \right) \qquad \text{[Equation 4]}$$

In Equation 4, $t_K$ denotes a vector reflecting the channel variation information measured by the BS K, $H_{LK}$ denotes the channel between the BS K and the MS L used to generate the beamforming weight, $\tilde{H}_{LK}$ denotes the channel between the BS K which generates and confirms the beamforming weight and the MS L, and $\varepsilon_K$ denotes a correction factor used to determine the vector by reflecting the channel variation information at the BS K. For example, when the corrector factor $\varepsilon$ is set to a noise power, the BS1 210 can determine a channel variation vector by considering the noise vector.

The vector $t_K$ reflecting the channel variation information in Equation 4 is expressed as a function of the channel status information transmitted to the BS2 220 and the channel status information newly received from the MS as expressed in Equation 4. When $t_K$ is determined using the inverse of the matrix in Equation 4, $t_K$ can be given by Equation 5.

$$t_K = \begin{bmatrix} \tilde{H}_{1K} \\ \tilde{H}_{2K} \end{bmatrix}^{\#} \begin{bmatrix} H_{1K} \\ H_{2K} \end{bmatrix} \quad \text{[Equation 5]}$$

In Equation 5, $t_K$ denotes the vector reflecting the channel variation information measured by the BS K, $H_{LK}$ denotes the channel between the BS K and the MS L used to generate the beamforming weight, $\tilde{H}_{LK}$ denotes the channel between the BS K which generates and confirms the beamforming weight and the MS L, and $[\bullet]^{\#}$ notes the pseudo inverse.

After determining the channel variation in step 245, the BS1 210 updates the beamforming weight generated in step 241 using the determined channel variation in step 247. For example, the BS1 210 updates the beamforming weight vector based on Equation 6.

$$w_{LK}' = t_K \times w_{LK} \quad \text{[Equation 6]}$$

In Equation 6, $w_{LK}'$ denotes the beamforming weight vector updated based on the channel variation, $t_K$ denotes the vector reflecting the channel variation information measured by the BS K. $w_{LK}$, which is an $N_T \times 1$ vector, denotes the beamforming weight vector for the MS L generated by the BS K.

In the same manner as the BS1 210, the BS2 220 generates the beamforming weight in step 251, determines the channel variation in step 253, and updates the beamforming weight according to the channel variation in step 255.

In step 249, the BS1 210 transmits a signal to the MS 200 using the updated beamforming weight. Alternatively, the BS1 210 and the BS2 220 may transmit the signal to the MS 200 at the same time using the updated beamforming weight.

When the BS1 210 and the BS2 220 transmit the signal using the updated beamforming weight by considering the channel variation, the MS 200 receives the signal as expressed as Equation 7.

$$\begin{bmatrix} r_1 \\ r_2 \end{bmatrix} = \begin{bmatrix} \tilde{H}_{11} & \tilde{H}_{12} \\ \tilde{H}_{21} & \tilde{H}_{22} \end{bmatrix} \begin{bmatrix} t_1 & 0 \\ 0 & t_2 \end{bmatrix} \begin{bmatrix} w_{11} & w_{21} \\ w_{12} & w_{22} \end{bmatrix} \begin{bmatrix} s_1 \\ s_2 \end{bmatrix} + n \quad \text{[Equation 7]}$$

In Equation 7, $r_K$ denotes the signal received at the MS K, $\tilde{H}_{LK}$ denotes the channel between the BS K which generates and confirms the beamforming weight and the MS L, and $t_K$ denotes the vector reflecting the channel variation information measured by the BS K. $w_{LK}$, which is an $N_T \times 1$ vector, denotes the beamforming weight vector generated by the BS K for the MS L. $s_K$ denotes the signal transmitted from the BS to the MS K, and n denotes noise.

The MS 200 can acquire a signal with the inter-cell interference removed based on Equation 8 by substituting Equation 5 for determining $t_K$ and Equation 2 for determining the beamforming weight into Equation 7.

$$\begin{bmatrix} r_1 \\ r_2 \end{bmatrix} = \begin{bmatrix} \tilde{H}_{11} t_1 & \tilde{H}_{12} t_2 \\ \tilde{H}_{21} t_1 & \tilde{H}_{22} t_2 \end{bmatrix} \begin{bmatrix} H_{11} & H_{12} \\ H_{21} & H_{22} \end{bmatrix}^{\#} \begin{bmatrix} s_1 \\ s_2 \end{bmatrix} + n \quad \text{[Equation 8]}$$

$$= \begin{bmatrix} H_{11} & H_{12} \\ H_{21} & H_{22} \end{bmatrix} \begin{bmatrix} H_{11} & H_{12} \\ H_{21} & H_{22} \end{bmatrix}^{\#} \begin{bmatrix} s_1 \\ s_2 \end{bmatrix} + n$$

$$= \begin{bmatrix} s_1 \\ s_2 \end{bmatrix} + n$$

In Equation 8, $r_K$ denotes the signal received at the MS K, $\tilde{H}_{LK}$ denotes the channel between the BS K which generates and confirms the beamforming weight and the MS L, $H_{LK}$ denotes the channel between the BS K and the MS L used to generate the beamforming weight, and $t_K$ denotes the vector reflecting the channel variation information measured by the BS K. $w_{LK}$, which is $N_T \times 1$ vector, denotes the beamforming weight vector generated by the BS K for the MS L. $s_K$ denotes the signal transmitted from the BS to the MS K, and n denotes noise.

In the above exemplary embodiment, as transmitting the channel status information to the BS2 220, the BS1 210 requests the channel status information feedback to the MS 200. However, the BS1 210 can request the channel status information feedback to the MS 200 at any time between the transmission of the channel status information to the BS2 220 and the generation of the beamforming weight. According to the channel status information feedback request of the BS, the MS 200 feeds the channel status information or the sounding channel back to the BS.

Figure 3:
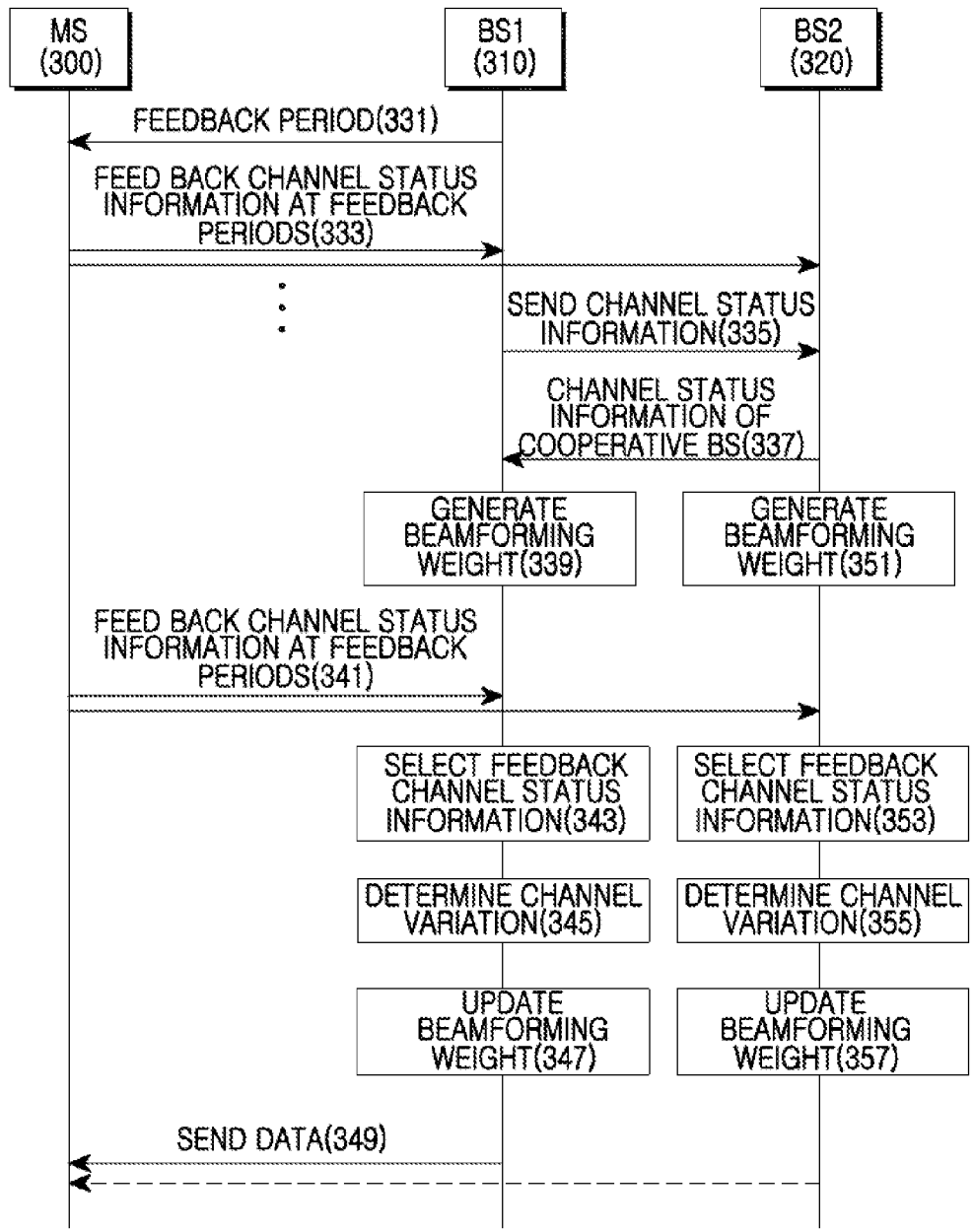
FIG. 3 illustrates a process for providing the base station cooperative service according to an exemplary embodiment of the present invention.

Alternatively, the MS 200 can periodically feed the channel status information or the sounding channel back to the BSs 210 and 220. In this case, the BS1 210 and the BS2 220 using the BS cooperative scheme can generate the beamforming weight by taking into account the channel variation as shown in FIG. 3. The BS1 and the BS2 generate the beamforming weight in the same manner. The MS1 and MS2 feed back the channel status information according to the direction of their serving BS in the same manner. Accordingly, discussion of the MS2 and the BS2 are omitted for brevity.

In FIG. 3, it is assumed that the MS transmits the sounding channel to the BS, and the BS generates the beamforming weight by considering the channel status information confirmed from the sounding channel. When the MS transmits the channel status information to the BS, the BS may be able to generate the beamforming weight in the same manner.

FIG. 3 illustrates a process for providing the BS cooperative service according to an exemplary embodiment of the present invention.

Referring to FIG. 3, the BS1 310 transmits feedback period information to the serviced MS 300 in step 331. For example, the BS1 310 can transmit the feedback period information at the initial access of the MS 300. The BS1 310 may also determine the feedback period by taking into account the channel exchange delay between the BSs.

When the feedback period arrives, the MS 300 sends the sounding signal to the BS1 310 and the BS2 320 in step 333. For example, the MS 300 sends the same sounding signal to the BS1 310 and the BS2 320. Alternatively, the MS 300 may send the different sounding signals to the BS1 310 and the BS2 320.

The BS1 310 and the BS2 320 acquire the channel status information of the MS 300 from the sounding signal received from the MS 300. For example, referring back to FIG. 1, the BS1 100 acquires the $H_{11}$ information from the sounding signal of the MS1 102 and the $H_{21}$ information from the sounding signal of the MS2 112. The BS2 110 of FIG. 1 acquires the $H_{12}$ information from the sounding signal of the MS1 102 and the $H_{22}$ information from the sounding signal of the MS2 112.

The BS1 310 transmits its acquired channel status information to the BS2 320 over the backhaul in step 335. The BS2 320 transmits its acquired channel status information to the BS1 310 in step 337. The BS1 310 and the BS2 320 can exchange the channel status information at the same time or at different times.

Upon receiving the channel status information from the BS2 320, the BS1 310 generates the beamforming weight using the channel status information of the MS 300 and the channel status information provided from the BS2 320 in step 339. For example, the BS1 310 generates the beamforming weight vector using the channel status information of the MS 300 and the channel status information provided from the BS2 320 based on Equation 2.

After generating the beamforming weight, the BS1 310 selects the channel status information to be used to determine the channel variation in step 343. The MS 300 continuously sends the sounding signal to the BS1 310 and the BS2 320 by the feedback periods in steps 333 and 341. The BS1 310 and the BS 320 select the channel status information to use to examine the channel variation according to the channel exchange delay among the channel status information confirmed from the sounding channels periodically provided from the MS 300. For example, the BS1 310 selects the channel status information confirmed from the sounding signal received from the MS 300 most closely to the time when the channel status information is provided from the BS2 320. Alternatively, the BS1 310 may select the channel status information acquired from the sounding channel received from the MS 300 most closely to the time when the channel variation is confirmed.

In step 345, the BS1 310 confirms the channel variation by comparing the channel status information used to generate the beamforming weight and the channel status information selected in step 343. For example, when determining the vector $t_K$ based on the channel variation information using the inverse function of the matrix, the BS1 310 can acquire $t_K$ based on Equation 5.

In step 347, the BS1 310 updates the beamforming weight generated in step 339 using the determined channel variation. For example, the BS1 310 updates the beamforming weight vector based on Equation 6.

In the same manner as the BS1 310, the BS2 320 generates the beamforming weight in step 351, selects the channel status information in step 353, determines the channel variation in step 355, and updates the beamforming weight by considering the channel variation in step 357.

The BS1 310 sends a signal to the MS 300 using the updated beamforming weight in step 349. The BS1 310 and the BS2 320 may send the signal to the MS 300 using the updated beamforming weight at the same time.

A structure of the BS for generating the beamforming weight by considering the channel variation in the process of the channel status information exchange is described with reference to FIG. 4.

Figure 4:
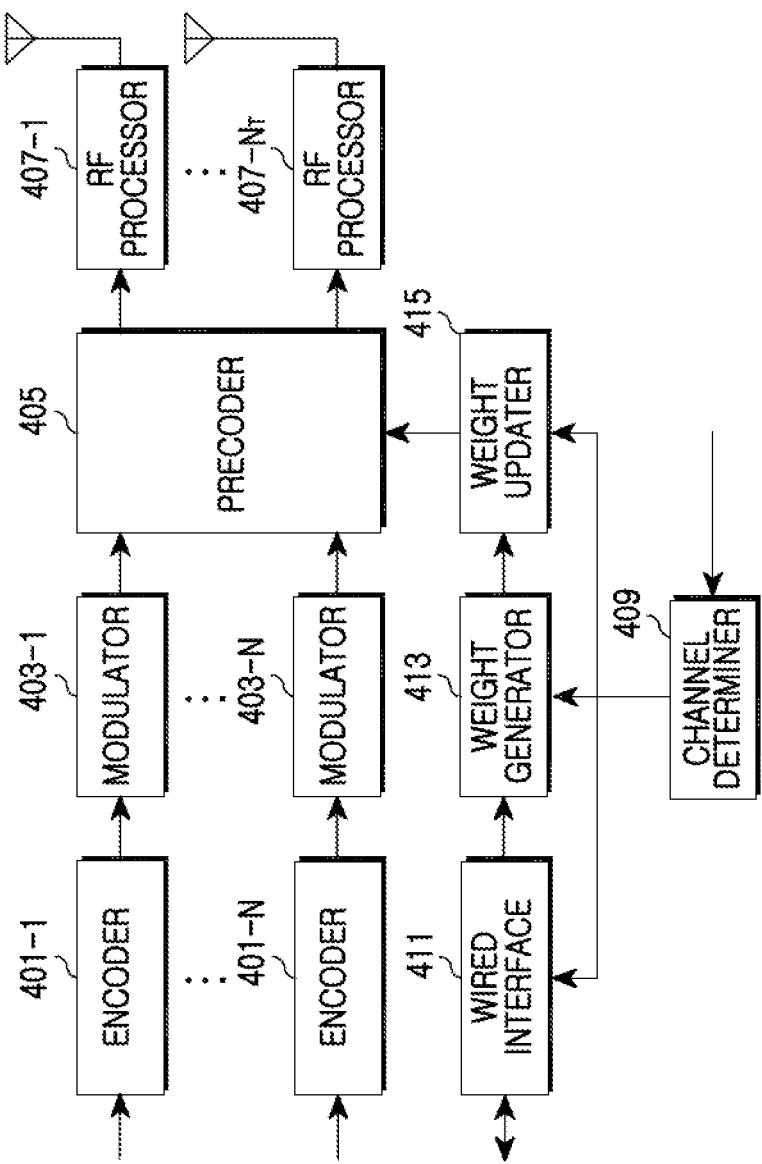
FIG. 4 illustrates a structure of a base station for the base station cooperative service according to an exemplary embodiment of the present invention.

FIG. 4 is a block diagram of the BS for the BS cooperative service according to an exemplary embodiment of the present invention.

Referring to FIG. 4, the BS includes encoders 401-1 through 401-N, modulators 403-1 through 403-N, a precoder 405, Radio Frequency (RF) processors 407-1 through 407-$N_T$, a channel determiner 409, a wired interface 411, a weight generator 413, and a weight updater 415. According to other exemplary embodiments of the present invention, the BS may include additional and/or different units. Similarly, the functionality of two or more of the above units may be integrated into a single component.

The encoders 401-1 through 401-N encode the data to send to the MS in a modulation level suitable for the channel status of the MS. The modulation level indicates a Modulation and Coding Scheme (MCS) level. The modulators 403-1 through 403-N modulate the encoded signal output from the encoders 401-1 through 401-N in the modulation level suitable for the channel status of the MS.

The precoder 405 precodes the modulated signals output from the modulators 403-1 through 403-N with a precode provided from the weight updater 415, and outputs the precoded signals to the RF processors 407-1 through 407-NT connected to respective antennas. The RF processors 407-1 through 407-$N_T$ convert the precoded signal output from the precoder 405 into an analog signal. The RF processors 407-1 through 407-$N_T$ convert the analog signal into an RF signal and transmit the RF signal via the corresponding antenna.

The channel determiner 409 determines the channel status information received from the MSs traveling in the service coverage area. For example, with reference to the BS1 100 of FIG. 1, the channel determiner 409 confirms the channel status information based on the sounding signals received from the MSs 102 and 112. The channel determiner 409 confirms the $H_{11}$ information from the sounding signal of the MS1 102 and the $H_{21}$ information from the sounding signal of the MS2 112. Alternatively, the channel determiner 409 may receive the channel status information fed back from the MS1 102. The channel determiner 409 acquires the $H_{11}$ information and the $H_{12}$ information from the feedback information received from the MS1 102. $H_{11}$ indicates the downlink channel between the BS1 100 and the MS1 102, $H_{21}$ indicates the downlink channel between the BS1 100 and the MS2 112, and $H_{12}$ indicates the downlink channel between the BS2 110 and the MS1 102.

The wired interface 411 communicates with the BSs using the BS cooperative scheme over the backhaul. For example, the wired interface 411 transmits the channel status information output from the channel determiner 409 to the other BSs using the BS cooperative scheme over the backhaul. The wired interface 411 receives the channel status information from the other cooperative BSs over the backhaul.

The weight generator 413 generates the beamforming weight using the channel status information fed from the channel determiner 409 and the channel status information of at least one cooperative BS provided from the wired interface 411. For example, the weight generator 413 determines the beamforming weight vector based on Equation 2.

The weight updater 415 updates the beamforming weight generated by the weight generator 413 by taking into account the channel variation that occurs when the channel status information is exchanged with the at least one cooperative BS. For example, the weight updater 415 examines the channel variation by comparing the channel status information used to generate the beamforming weight at the weight generator 413 with the channel status information received by requesting the channel status information feedback to the MS to detect the channel variation.

Alternatively, when periodically receiving the channel status information fed back from the MS, the weight updater 415 selects the channel status information of the MS confirmed most closely to the time when the wired interface 411 receives the channel status information from the at least one cooperative BS. The weight updater 415 may determine the channel variation by comparing the channel status information used to generate the beamforming weight at the weight generator 413 with the selected channel status information.

When the channel status information is fed back from the MS periodically, the weight updater 415 may select the channel status information of the MS confirmed most closely to the time of the confirmed channel variation. The weight updater 415 may examine the channel variation by comparing the channel status information used to generate the beamforming weight at the weight generator 413 with the selected channel status information.

In this exemplary embodiment, the BSs using the BS cooperative scheme exchange the channel status information through the backhaul in order to generate the beamforming weight. Alternatively, the BSs using the BS cooperative scheme may send the channel status information to a control server over the backhaul as shown in FIG. 5.

Figure 5:
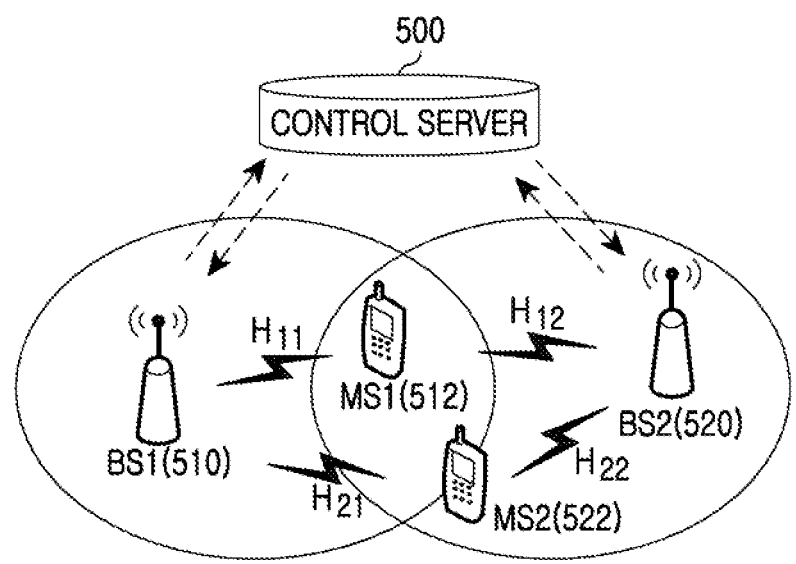
FIG. 5 illustrates a structure of a wireless communication system providing the base station cooperative service using a control server according to an exemplary embodiment of the present invention.

FIG. 5 illustrates a structure of a wireless communication system providing the BS cooperative service using the control server according to an exemplary embodiment of the present invention.

Referring to FIG. 5, the MS1 512, which travels in the service coverage area of the BS1 510, is serviced by the BS1 510, or by the BS1 510 and the BS2 520 at the same time as shown in FIG. 1. The BS1 510 is the serving BS of the MS1 512.

The MS2 522, which travels in the service coverage area of the BS2 520, is serviced by the BS2 520, or by the BS1 510 and the BS2 520 at the same time. The BS2 520 is the serving BS of the MS2 522. The MS1 512 and the MS2 522 are assumed to be able to acquire not only the channel to the serving BS but also the channel to the neighboring BS.

When using the BS cooperative scheme, the BS1 510 and the BS2 520 transmit the channel status information acquired from the MSs 512 and 522 traveling in their service coverage area, to the control server 500. For example, the BSs 510 and 520 transmit the channel status information acquired from sounding signals received from the MSs 512 and 522, to the control server 500. The BS1 510 transmits $H_{11}$ information acquired from the sounding signal of the MS1 512 and $H_{21}$ information acquired from the sounding signal of the MS2 522 to the control server 500 through the backhaul. The BS2 520 transmits $H_{12}$ information acquired from the sounding signal of the MS1 512 and $H_{22}$ information acquired from the sounding signal of the MS2 522 to the control server 500 through the backhaul.

Alternatively, the BSs 510 and 520 may transmit the channel status information provided from the MSs 512 and 522 to the control server 500. The BS1 510 transmits the $H_{11}$ information and the $H_{12}$ information provided from the MS1 512 to the control server 500 through the backhaul. The BS2 520 transmits the $H_{21}$ information and the $H_{22}$ information provided from the MS2 522 to the control server 500 through the backhaul.

Figure 6:
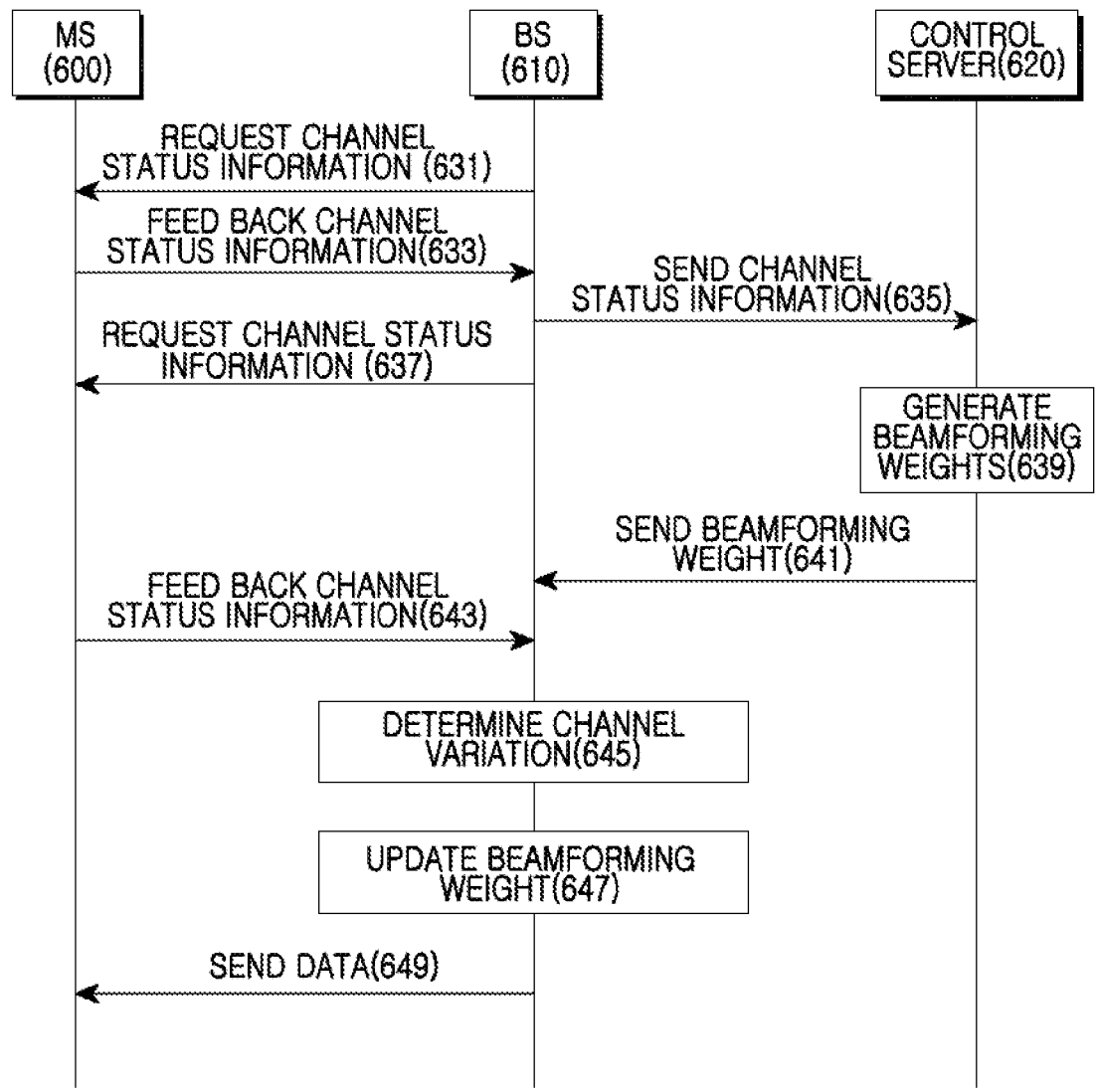
FIG. 6 illustrates a process for providing the base station cooperative service using the control server according to an exemplary embodiment of the present invention.

The control server 500 generates the beamforming weight for each of the BSs 510 and 520 using the channel status information provided from the BSs 510 and 520. The control server 500 sends the generated beamforming weights to the BSs 510 and 520 respectively. When the beamforming weight is provided from the control server 500, the BS1 510 and the BS2 520 update the beamforming weight by taking into account the channel variation that occurring when the channel status information is transmitted to the control server 500, as shown in FIG. 6. Since the BS1 510 and the BS2 520 generate the beamforming weight in the same manner, detailed description of the operation of the BS2 520 is omitted for brevity.

In FIG. 6, it is assumed that the MS sends a sounding channel to the BS and the BS generates the beamforming weight by taking into account the channel status information acquired from the sounding channel. However, when the MS transmits the channel status information to the BS, the BS may generate the beamforming weight in the same manner.

FIG. 6 illustrates a process for providing the BS cooperative service using the control server according to an exemplary embodiment of the present invention.

Referring to FIG. 6, the BS 610 and the BS2 service the MS using the BS cooperative scheme. The BS 610 requests channel status information from the serviced MS 200 in step 631. The BS may also send time information for the MS 600 to feed back the channel status information.

According to the channel status information request of the BS 610, the MS 600 sends the sounding signal to the BS 610 and the BS2 in step 633. For example, the MS 600 sends the same sounding signal to the BS 610 and the BS2. Alternatively, the MS 600 may send different sounding signals to the BS 610 and the BS2. The MS 600 sends the sounding signal according to the feedback time information provided from the BS 610. The MS 610 may send the sounding signal after the channel status information feedback is requested from the BS 610 and a preset time elapses.

The BS 610 acquires the channel status information of the MS 600 from the sounding signal received from the MS 600. For example, the BS1 100 of FIG. 1 acquires the $H_{11}$ information from the sounding signal of the MS1 102 and the $H_{21}$ information from the sounding signal of the MS2 112.

In step 635, the BS 610 transmits its acquired channel status information to the control server 620 through the backhaul. In doing so, the BS2 transmits its acquired channel status information to the control server 620 over the backhaul. The BS 610 and the BS2 can transmit the channel status information to the control server 620 at the same time or at different times.

To detect the channel variation when the channel status information is transmitted to the control server 620, the BS 610 requests the channel status information from the MS 600 in step 637. The BS 610 may also transmit feedback time information of the channel status information for the MS 600.

The control server 620 generates the beamforming weights using the channel status information provided from the BS 610 and the BS2 in step 639. For example, the control server 620 generates the beamforming weight vector for each BS using the channel status information provided from the BS 610 and the BS2 based on Equation 2.

The control server 620 sends the generated beamforming weight to the BS 610 in step 641. The control server 620 sends the generated beamforming weight to the BS2 as well.

According to the channel status information request of the BS 610, the MS 600 sends the sounding signal to the BS 610 and the BS2 in step 643. For example, the MS 600 sends the sounding signals according to the feedback time information received from the BS 610. The MS 600 may send the sounding signals after the channel status information is requested from the BS 610 and a preset time elapses.

When receiving the sounding channel from the MS 600, the BS 610 confirms the channel status information of the MS 600 through the sounding channel. The BS 610 determines the channel variation by comparing the channel status information used to generate the beamforming weight with the confirmed channel status information in step 645. For example, to determine the vector $t_K$ based on the channel variation information using the inverse function of the matrix, the BS 610 can acquire $t_K$ based on Equation 5.

After determining the channel variation, the BS 610 updates the beamforming weight provided from the control server 620 using the determined channel variation in step 647. For example, the BS 610 updates the beamforming weight vector based on Equation 6.

The BS 610 transmits a signal to the MS 600 using the updated beamforming weight in step 649. The BS 610 and the BS2 may transmit the signal to the MS 600 at the same time using the updated beamforming weight.

In this exemplary embodiment, as transmitting the channel status information to the control server 620, the BS 610 requests the channel status information from the MS 600. However, the BS 610 can request the channel status information from the MS 600 at any time between the transmission of the channel status information to the control server 620 and the reception of the beamforming weight from the control server 620.

According to the channel status information request of the BS, the MS feeds the channel status information back to the BS. Alternatively, the MS can periodically feed the channel status information to the BS. In this case, the BS1 and the BS2 using the BS cooperative scheme can generate the beamforming weight by taking into account the channel variation as shown in FIG. 7.

Figure 7:
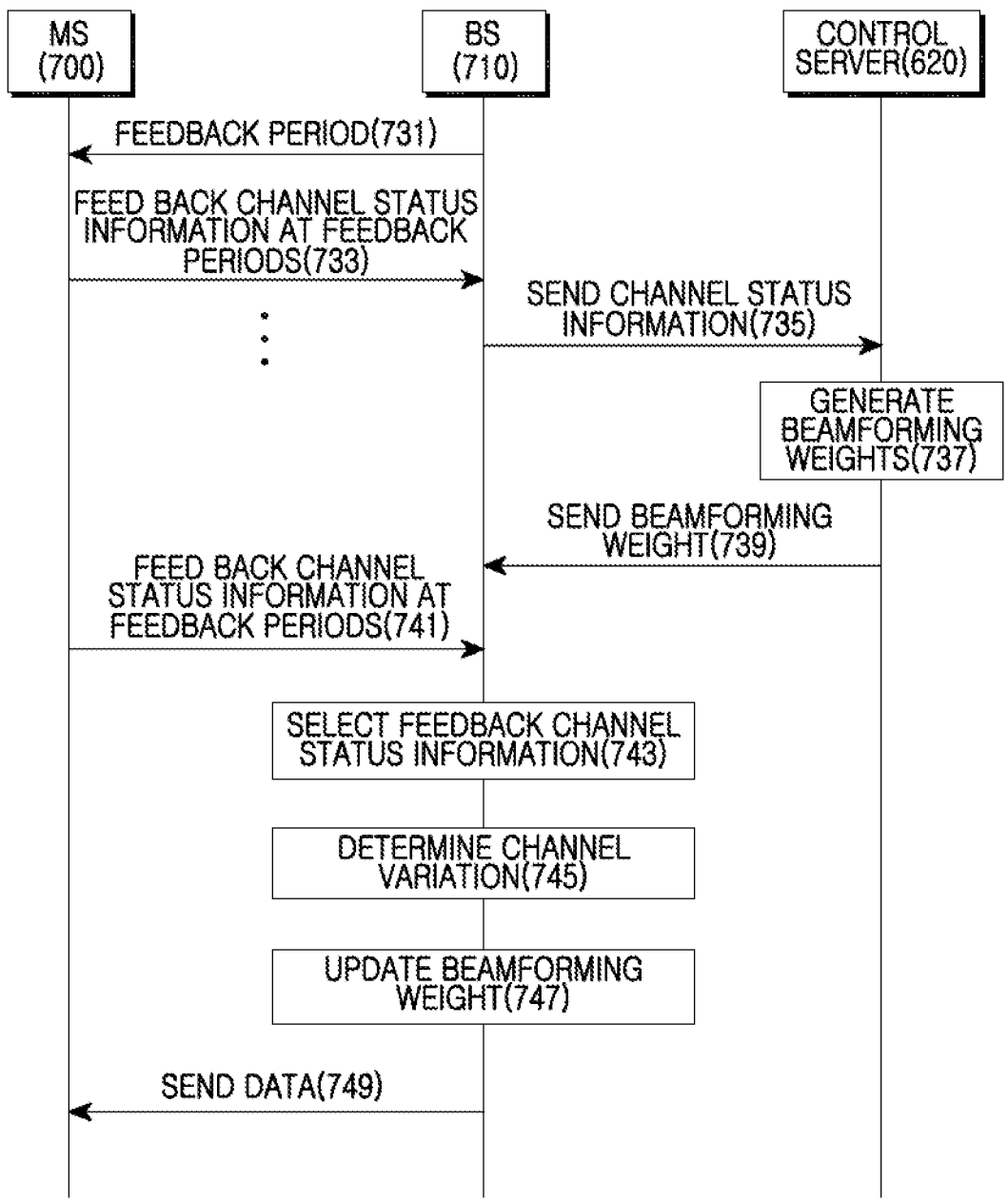
FIG. 7 illustrates a process for providing the base station cooperative service using the control server according to an exemplary embodiment of the present invention.

In FIG. 7, it is assumed that the MS transmits the sounding channel to the BS, and the BS generates the beamforming weight by considering the channel status information obtained from the sounding channel. The BS may also be able to generate the beamforming weight in the same manner when the MS transmits the channel status information to the BS.

FIG. 7 illustrates a process for providing the BS cooperative service using the control server according to an exemplary embodiment of the present invention.

Referring to FIG. 7, The BS 710 transmits feedback period information to the serviced MS 700 in step 731. For example, the BS 710 can transmit the feedback period information at the initial access of the MS 700. Also, the BS1 310 may determine the feedback period by taking into account the channel exchange delay between the BSs.

When the feedback period arrives, the MS 700 sends the sounding signal to the BS 710 and the BS2 in step 733. For example, the MS 700 sends the same sounding signal to the BS 710 and the BS2. Alternatively, the MS 700 may send the different sounding signals to the BS 710 and the BS2. The BS2 represents a BS which uses the BS cooperative scheme with the BS1.

The BS 710 and the BS2 acquire the channel status information of the MS 700 from the sounding signal received from the MS 700. For example, the BS1 100 of FIG. 1 acquires the $H_{11}$ information from the sounding signal of the MS1 102 and the $H_{21}$ information from the sounding signal of the MS2 112.

In step 735, the BS 710 transmits its acquired channel status information to the control server 720 over the backhaul. The BS2 also transmits its acquired channel status information to the control server 720 over the backhaul. The BS 710 and the BS2 can transmit the channel status information to the control server 720 at the same time or at different times.

The control server 720 generates the beamforming weights using the channel status information provided from the BS 710 and BS2 in step 737. For example, the control server 720 generates the beamforming weight vector for each BS using the channel status information provided from the BS 710 and BS2 based on Equation 2.

The control server 720 sends the generated beamforming weight to the BS 710 in step 739. The control server 720 sends the generated beamforming weight to the BS2 as well.

Upon receiving the beamforming weight from the control server 720, the BS 710 selects the channel status information to use to determine the channel variation in step 743. The MS 700 continuously sends the channel status information to the BS 710 and the BS2 by the feedback periods in steps 733 and 741. The BS 710 and the BS2 select the channel status information to use to examine the channel variation according to the channel status information transmission delay among the channel status information obtained from the sounding channels periodically provided from the MS 700. For example, the BS 710 selects the channel status information confirmed from the sounding signal received from the MS 700 most closely to the time when the beamforming weight is provided from the control server 720. Alternatively, the BS 710 may select the channel status information acquired from the sounding signal received from the MS 700 most closely to the time when the channel variation is confirmed.

In step 745, the BS 710 confirms the channel variation by comparing the channel status information received from the control server 720 with the channel status information selected in step 743. For example, when determining the vector $t_K$ based on the channel variation information using the inverse function of the matrix, the BS 710 can acquire $t_K$ based on Equation 5.

In step 747, the BS 710 updates the beamforming weight received from the control server 720 using the determined channel variation. For example, the BS 710 updates the beamforming weight vector based on Equation 6.

The BS 710 sends a signal to the MS 700 using the updated beamforming weight in step 749. The BS 710 and the BS2 may send the signal to the MS 700 using the updated beamforming weight at the same time. A structure of the BS for updating the beamforming weight by considering the channel variation in the process of the channel status information exchange is described below with reference to FIG. 8.

Figure 8:
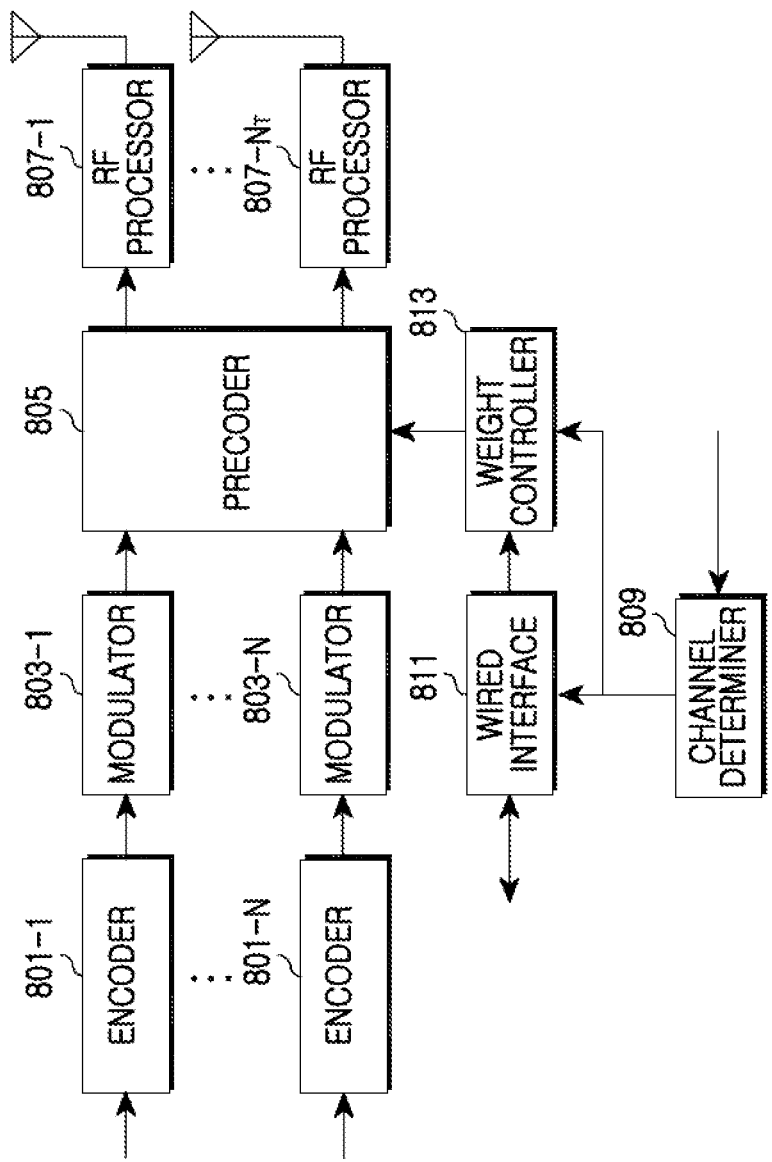
FIG. 8 illustrates a structure of the base station for the base station cooperative service using the control server according to an exemplary embodiment of the present invention.

FIG. 8 is a block diagram of the BS for the BS cooperative service using the control server according to an exemplary embodiment of the present invention.

Referring to FIG. 8, the BS includes encoders 801-1 through 801-N, modulators 803-1 through 803-N, a precoder 805, RF processors 807-1 through 807-$N_T$, a channel determiner 809, a wired interface 811, and a weight controller 813.

The encoders 801-1 through 801-N encode the data to send to the MS in a modulation level suitable for the channel status of the MS. The modulation level indicates the MCS level. The modulators 803-1 through 803-N modulate the encoded signal output from the encoders 801-1 through 801-N in the modulation level suitable for the channel status of the MS.

The precoder 805 precodes the modulated signals output from the modulators 803-1 through 803-N with a precode provided from the weight controller 813, and outputs the precoded signals to the RF processors 807-1 through 807-$N_T$ connected to respective antennas. The RF processors 807-1 through 807-$N_T$ convert the precoded signal output from the precoder 805 to an analog signal. The RF processors 807-1 through 807-$N_T$ also convert the analog signal to an RF signal and transmit the RF signal via the corresponding antenna.

The channel determiner 809 determines the channel status information received from the MSs traveling in the service coverage area. For example, with reference to the BS1 100 of FIG. 1, the channel determiner 809 determines the channel status information based on the sounding signals received from the MSs 102 and 112. The channel determiner 809 confirms the $H_{11}$ information from the sounding signal of the MS1 102 and the $H_{21}$ information from the sounding signal of the MS2 112. Alternatively, the channel determiner 809 confirms the channel status information fed back from the MS1 102. The channel determiner 809 acquires the $H_{11}$ information and the $H_{12}$ information from the feedback information received from the MS1 102.

The wired interface 811 communicates with the control server over the backhaul. For example, the wired interface 811 transmits the channel status information output from the channel determiner 809 to the control server through the backhaul. The wired interface 811 receives the beamforming weight from the control server over the backhaul.

The weight controller 813 updates the beamforming weight provided from the control server by taking into account the channel variation occurring when the channel status information is transmitted to the control server via the wired interface 811. For instance, the weight controller 813 requests the channel status information from the MS so as to detect the channel status information transmitted to the control server via the wired interface 811 and the channel variation. The weight controller 813 confirms the channel variation by comparing the channel status information received from the MS.

When periodically receiving the channel status information fed back from the MS, the weight controller 813 may select the channel status information fed back from the MS most closely to the time of the reception of the beamforming weight via the wired interface 811. The weight controller 813 may confirm the channel variation by comparing the channel status information transmitted to the control server with the selected channel status information.

When periodically receiving the channel status information fed back from the MS, the weight controller 813 may select the channel status information provided from the MS most closely to the time of the confirmation of the channel variation. The weight controller 813 may confirm the channel variation by comparing the channel status information transmitted to the control server with the selected channel status information.

A structure of the control server for generating the beamforming weight using the channel status information received from the cooperative BSs is described below with reference to FIG. 9.

Figure 9:
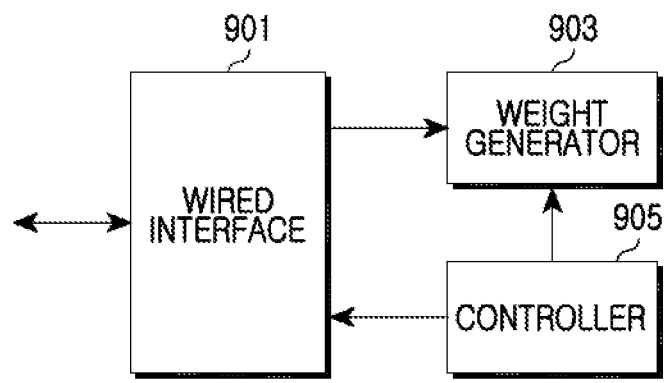
FIG. 9 illustrates a structure of the control server for generating a beamforming weight according to an exemplary embodiment of the present invention.

FIG. 9 is a block diagram of the control server for generating the beamforming weight according to an exemplary embodiment of the present invention.

Referring to FIG. 9, the control server includes a wired interface 901, a weight generator 903, and a controller 905.

The wired interface 901 transmits and receives signals with the BSs using the BS cooperative scheme over the backhaul. For example, the wired interface 901 receives the channel status information from at least two BSs using the BS cooperative scheme over the backhaul. The wired interface 901 sends the beamforming weights generated at the weight generator 903 to the BSs which transmit the channel status information through the backhaul.

The weight generator 903 generates the beamforming weights using the channel status information of the BSs fed from the wired interface 901 under the control of the controller 905. For example, the weight generator 903 generates the beamforming weight vectors using the channel status information of the BSs using the BS cooperative scheme based on Equation 2.

The controller 905 controls the operations of the control server. For example, the controller 905 controls the weight generator 903 to generate the beamforming weights using the channel status information of the BSs using the BS cooperative scheme provided via the wired interface 901. The controller 905 controls the wired interface 901 to send the beamforming weights generated at the weight generator 903 to the BSs.

The performance change when the beamforming weight is generated by considering the channel variation during the channel status information exchange between the BSs using the BS cooperative scheme is described below with reference to FIG. 10. It is assumed that the wireless communication system using the BS cooperative scheme includes two BSs having two antennas and one MS having one antenna.

Figure 10:
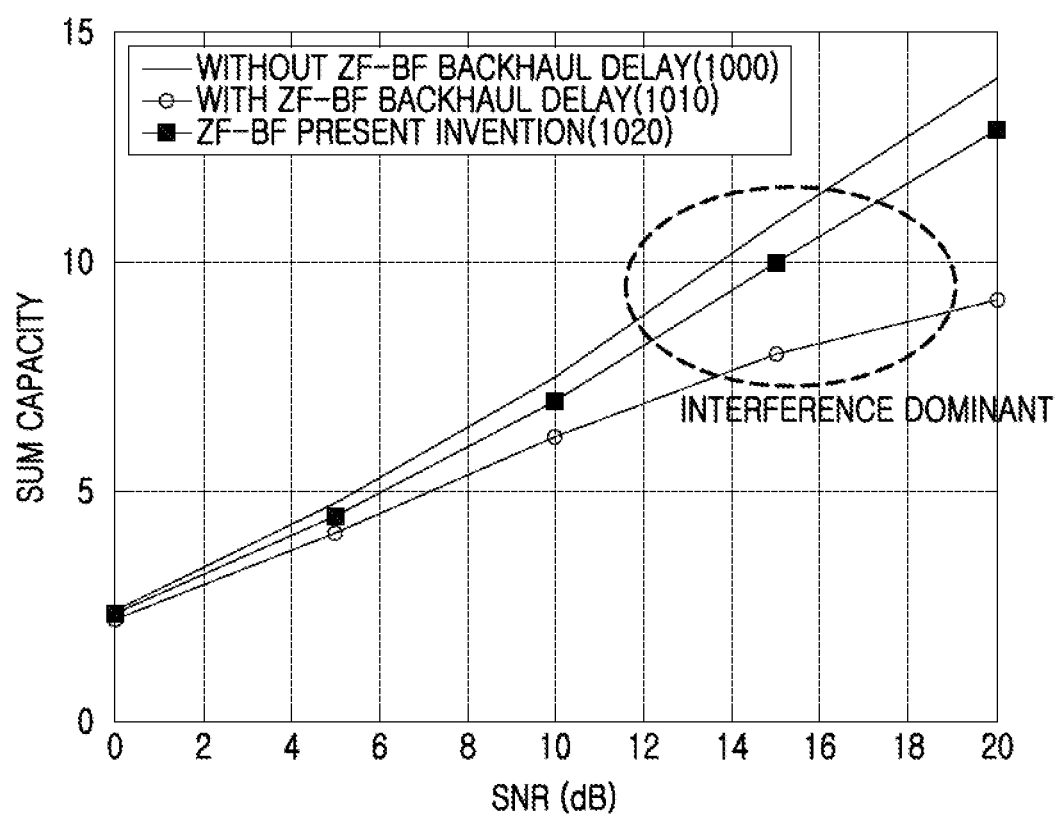
FIG. 10 is a graph of performance change according to an exemplary embodiment of the present invention.

FIG. 10 is a graph of the performance change according to an exemplary embodiment of the present invention.

Referring to FIG. 10, when the beamforming weight is generated using the ZF scheme, the sum capacity of the first beamforming scheme 1010 without considering the channel variation in the backhaul transmission delay is compared to the second beamforming scheme 1020 considering the channel variation.

When the BS cooperative scheme is used and there is no backhaul delay 1000 when the BSs exchange the channel status information, the optimum sum capacity can be attained. However, backhaul delay occurs in the actual environment when the BSs exchange the channel status information. Accordingly, when the beamforming weight is used by considering the channel variation as in the second beamforming scheme 1020, better sum capacity than the first beamforming scheme 1010 can be achieved. The inter-cell interference can be rejected more effectively than the first beamforming scheme 1010 by using the beamforming weight based on the channel variation as in the second beamforming scheme 1020.

As set forth above, the inter-cell interference can be reduced through the cooperation between the BSs by generating the beamforming weight based on the channel variation occurring in the channel exchange in the wireless communication system using the BS cooperative scheme.

While the invention has been described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for beamforming at a Base Station (BS) in a wireless communication system using a BS cooperative scheme, the method comprising:
exchanging channel status information with at least one cooperative BS which provides a BS cooperative service;
generating a beamforming weight based on the channel status information;
determining channel variation caused by a time delay in the channel status information exchange with the cooperative BS;
updating the generated beamforming weight based on the channel variation; and
precoding a transmit signal based on the updated beamforming weight,
wherein the generating of the beamforming weight comprises confirming channel status information with at least one serviced Mobile Station (MS) that periodically transmits the channel status information.

2. The method of claim 1, wherein the generating of the beamforming weight further comprises:
exchanging the channel status information with at least one cooperative BS which provides the BS cooperative service; and
generating the beamforming weight using the channel status information of the at least one serviced MS and the exchanged channel status information.

3. The method of claim 1, wherein the confirming of the channel status information comprises:
requesting channel status information from the at least one serviced MS; and
confirming the channel status information transmitted from the at least one serviced MS.

4. The method of claim 1, wherein the channel status information is exchanged with at least one cooperative BS which provides the BS cooperative service over a backhaul.

5. The method of claim 1, wherein the determining of the channel variation comprises:
selecting channel status information most recently provided among at least one channel status information received from a serviced MS; and
determining the channel variation by comparing the selected channel status information with the channel status information used to generate the beamforming weight.

6. A method for beamforming at a Base Station (BS) in a wireless communication system using a BS cooperative scheme, the method comprising:
transmitting channel status information of at least one serviced Mobile Station (MS) to a control server which generates beamforming weights for at least two BSs providing a BS cooperative service;

when receiving the beamforming weights from the control server, determining channel variation caused by a time delay in the channel status information transmission to the control server;

updating the beamforming weights provided from the control server based on the channel variation;

precoding a transmit signal based on the updated beamforming weights; and confirming channel status information periodically transmitted by the at least one serviced MS, before transmitting the channel status information of the at least one serviced MS.

7. The method of claim 6, further comprising:

requesting channel status information from at least one serviced MS, before transmitting the channel status information of the MS; and receiving channel status information from the at least one serviced MS.

8. The method of claim 6, wherein the determining of the channel variation comprises:

selecting channel status information most recently provided among at least one channel status information received from the at least one serviced MS; and determining the channel variation by comparing the selected channel status information with the channel status information transmitted to the control server.

9. An apparatus for beamforming at a Base Station (BS) in a wireless communication system using a BS cooperative scheme, the apparatus comprising:

at least two antennas;

a weight generator for generating a beamforming weight based on channel status information exchanged with at least one other BS which provides a BS cooperative service;

a weight updater for updating the beamforming weight generated by the weight generator based on channel variation caused by a time delay in the channel status information exchange with the other BS; and a precoder for precoding a transmit signal based on the beamforming weight fed from the weight updater, a channel determiner for confirming channel status information with at least one serviced Mobile Station (MS) that periodically transmits the channel status information and confirming channel status information from a sounding signal or feedback information received from the at least one serviced MS, or receiving the channel status information from the at least one serviced MS by requesting the channel status information from the at least one serviced MS.

10. The apparatus of claim 9, further comprising:

a wired interface for exchanging the channel status information with at least one other BS which provides the BS cooperative service over a backhaul.

11. The apparatus of claim 9, wherein the weight updater determines the channel variation by comparing channel status information most recently provided among at least one channel status information received from a serviced MS with the channel status information used for the weight generator to generate the beamforming weight.

12. An apparatus for beamforming at a Base Station (BS) in a wireless communication system using a BS cooperative scheme, the apparatus comprising:

at least two antennas;

a wired interface for transmitting channel status information to a control server which generates beamforming weights for at least two BSs providing a BS cooperative service;

a weight controller for, when receiving the beamforming weight from the control server, updating the beamforming weight received from the control server based on channel variation caused by a time delay in the channel status information transmission to the control server;

a precoder for precoding a transmit signal based on the beamforming weight provided from the weight controller; and a channel determiner for confirming channel status information of at least one serviced MS.

13. The apparatus of claim 12, wherein the channel determiner confirms the channel status information from a sounding signal or feedback information received from at least one serviced MS.

14. The apparatus of claim 12, wherein the weight updater determines the channel variation by comparing channel status information most recently provided among at least one channel status information received from the at least one serviced MS, with the channel status information transmitted to the control server.

15. A method of beamforming in a Base Station (BS) employing a BS cooperative scheme, the method comprising:

obtaining a beamforming weight based on channel status information received from at least one cooperative BS providing a cooperative BS service;

receiving channel status information periodically transmitted from at least one serviced Mobile Station (MS);

determining a channel variation caused by a time delay in the obtaining of the beamforming weight;

updating the beamforming weight based on the channel variation and the channel status information;

precoding a transmit signal based on the updated beamforming weight; and transmitting the precoded transmit signal to the at least one serviced MS.

16. The method of claim 15, wherein the obtaining of the beamforming weight comprises:

receiving the beamforming weight from a control server receiving the channel status information from the at least one cooperative BS.

17. The method of claim 16, wherein the determining of the channel variation comprises:

determining the channel variation caused by a time delay in receiving the beamforming weight from the control server.

18. The method of claim 15, wherein the receiving of the channel status information periodically transmitted from the at least one serviced MS comprises selecting a most recently received channel status information as the channel status information for the updating of the beamforming weight.

* * * * *